Patented Nov. 20, 1945

2,389,427

UNITED STATES PATENT OFFICE 2,389,427

INSECT REPELLENTS

Samuel I. Gertler, Washington, D. C., assignor to the United States of America, as represented by the Secretary of Agriculture No Drawing. Application February 16, 1945, Serial No. 578,272

10 Claims. (Cl. 167—33)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to repellents of insects such as mosquitoes, flies, gnats, fleas, and the like, and has for its objects the preparation of repellent compositions which are effective long after application, are not easily removed in adverse weather, are not harmful to humans or animals, are not deleterious to textiles, and are not obnoxious in use.

I have found that certain compositions comprising liquid N-substituted butyl phthalimides, particularly N-sec.-butylphthalimide and N-butylphthalimide, and having the general formula

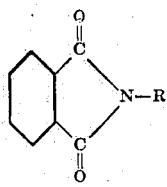

wherein R is a butyl radical, are effective as repellents against, for example, Aedes aegypti, a species of mosquito very widely distributed and a common carrier of yellow fever, and Anopheles quadrimaculatus, the malaria mosquito.

Most of the repellents used in the prior art are volatile and soon evaporate. The pure compound N-sec.-butylphthalimide, however, is a relatively non-volatile liquid having a boiling point of about from 113° C. to 114° C. at a pressure of about 2 mm. of mercury. It has little odor, and when rubbed on the skin produces no noticeably irritating effect. It is colorless and does not stain fabrics. N-butylphthalimide exhibits similar characteristics, and consequently, all these properties make the compounds ideal for the purposes intended.

Compositions containing N-sec.-butylphthalimide were used in a number of tests against Aedes aegypti, and it was found that protection was obtained for a minimum of 6.25 hours and up to 8.5 hours. In similar tests against Anopheles quadrimaculatus, protection was obtained for about 3 to 3.50 hours. However, in both these cases, by varying the compositions somewhat, and under certain conditions, even longer periods of repellent action were obtained. Similar tests with N-butylphthalimide gave similar repellent action.

Various types of compositions can be used to obtain good repellent effects, such compositions in the main comprising a compound of the above formula and an applicator. The applicator used depends on the conditions or purpose for which the repellent action is desired and may be in the form of a cream, lotion, dust, and so forth, the proportions of the ingredients being varied over a wide range. Other materials may be added to these applicators to give them consistency and form, if desired.

The following are examples of the form and method of use of my invention:

Example I

A repellent composition, in the form of a cream, comprising N-sec.-butylphthalimide, lanolin, petrolatum, and paraffin. Such a cream may be applied directly to the skin.

Example II

A repellent composition, in the form of a lotion, comprising N-sec.-butylphthalimide together with a mineral or vegetable oil such as corn oil, cottonseed oil, peanut oil, and the like. Such a lotion may also be rubbed directly on the skin.

Example III

Another repellent composition in the form of a lotion, comprising a solution of N-sec.-butylphthalimide in ethyl alcohol, glycerol, or any suitable solvent which is harmless to the skin.

Example IV

Another repellent composition in the form of a lotion, comprising an emulsion of N-sec.-butylphthalimide emulsified in water by the employment of an emulsifying agent, such as triethanolamine, and such other ingredients as may be necessary to obtain a suitable product.

Example V

A repellent composition, in the form of a dusting powder, comprising adsorbed N-sec.-butylphthalimide and a dusting powder such as talc.

Although N-sec.-butylphthalimide was used as the active insecticide in the above examples, N-butylphthalimide gives similar results.

It should be understood that the above type compositions need not be applied only to the skin.

Such compositions may also be dissolved in alcohol or in any volatile solvent and used to impregnate clothing.

Having thus described my invention, I claim:

1. An insect-repellent composition comprising a liquid compound of the formula

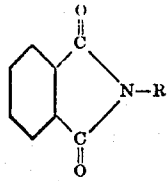

where R is a butyl radical, incorporated in an applicator.

2. An insect-repellent composition comprising N-sec.-butylphthalimide incorporated in an oil.

3. An insect-repellent composition comprising N-butylphthalimide incorporated in an oil.

4. An insect-repellent composition comprising N-sec.-butylphthalimide incorporated in a dusting powder.

5. An insect-repellent composition comprising N-butylphthalimide incorporated in a dusting powder.

6. An insect-repellent composition comprising N-sec.-butylphthalimide incorporated in a suitable solvent.

7. An insect-repellent composition comprising N-sec.-butylphthalimide incorporated in water with an emulsifier.

8. A process of repelling insects comprising applying to the region from which the insects are to be repelled a composition containing as its essential active ingredient a liquid compound of the formula

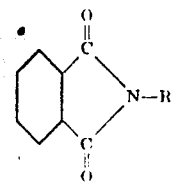

where R is a butyl radical.

9. A process of repelling insects comprising applying to the region from which the insects are to be repelled a composition containing N-sec.-butylphthalimide as its essential active ingredient.

10. A process of repelling insects comprising applying to the region from which the insects are to be repelled a composition containing N-butylphthalimide as its essential active ingredient.

SAMUEL I. GERTLER.